(12) United States Patent
Tilley

(10) Patent No.: US 6,766,757 B1
(45) Date of Patent: Jul. 27, 2004

(54) REMOTELY OPERATED OUTRIGGER

(76) Inventor: Richard T. Tilley, 5318 Falkirk Dr., Durham, NC (US) 27712

( * ) Notice: Subject to any disclaimer, the term of this patent is extended or adjusted under 35 U.S.C. 154(b) by 0 days.

(21) Appl. No.: 10/684,106

(22) Filed: Oct. 14, 2003

(51) Int. Cl.$^7$ ................................................ B63B 35/14
(52) U.S. Cl. ........................................ 114/255; 43/21.2
(58) Field of Search ................................ 114/255, 343; 43/21.2, 27.4; 248/515

(56) References Cited

U.S. PATENT DOCUMENTS

| | | | | |
|---|---|---|---|---|
| 4,993,346 A | * | 2/1991 | Rupp | 114/255 |
| 5,140,928 A | * | 8/1992 | Frick | 114/255 |
| 5,243,927 A | * | 9/1993 | Messick | 114/255 |
| 5,921,196 A | * | 7/1999 | Slatter | 114/255 |
| 6,053,122 A | * | 4/2000 | Jordan, III | 114/255 |
| 6,408,779 B1 | * | 6/2002 | Roy | 114/255 |
| 6,668,745 B2 | * | 12/2003 | Slatter | 114/255 |

* cited by examiner

Primary Examiner—Andrew Wright
(74) Attorney, Agent, or Firm—Mills Law Firm PLLC

(57) ABSTRACT

A remotely controlled outrigger for a fishing boat includes a mounting sleeve extending through the boat roof and a control cartridge rotatably supported by the sleeve. The control cartridge includes a hydraulic actuator operated by a handle below the roof to operate an actuator pumping assembly to extend an elevating piston to incline an outrigger boom pivotally supported at the upper end of the cartridge. The handle is rotated to swing the outrigger boom between detented inboard and outboard positions.

7 Claims, 7 Drawing Sheets

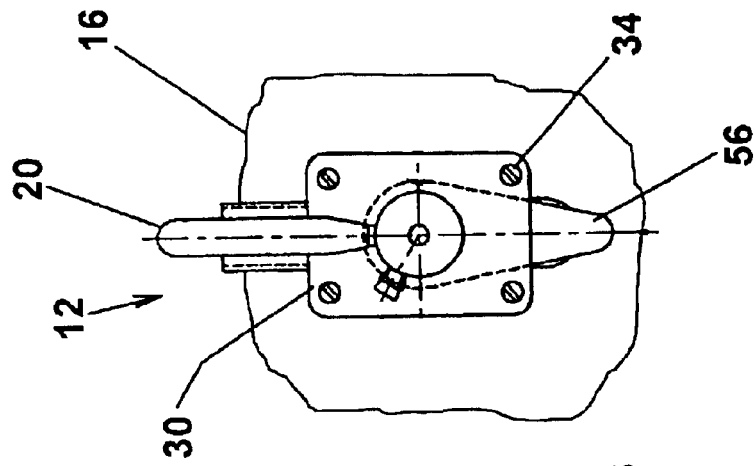
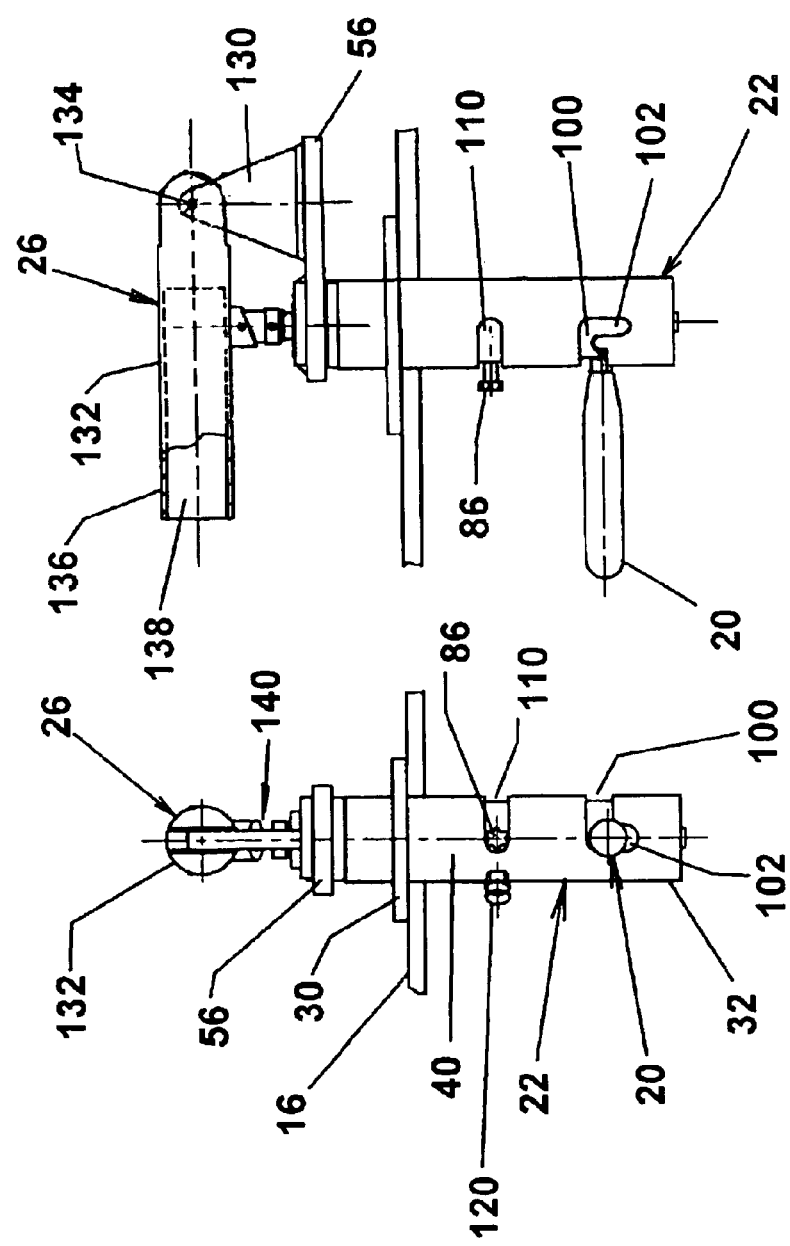

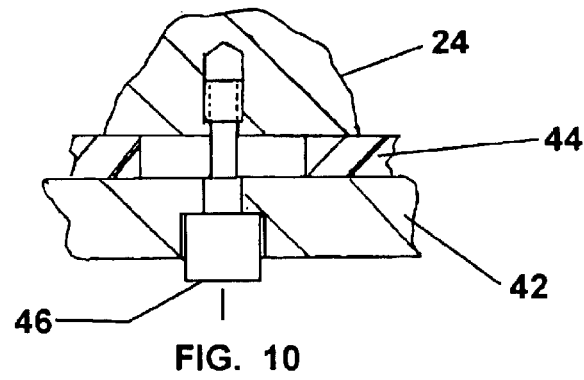
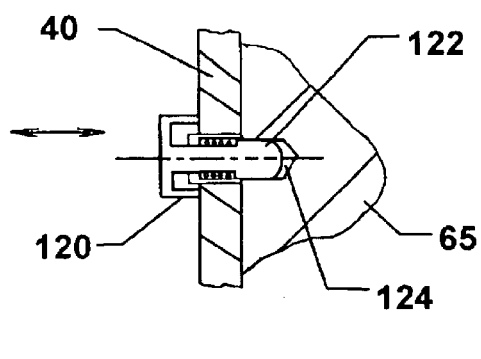
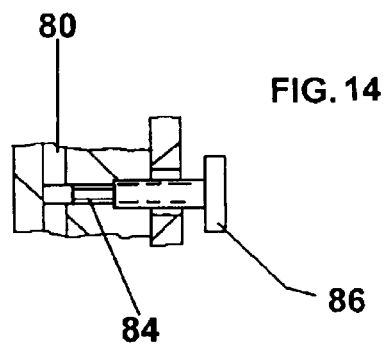
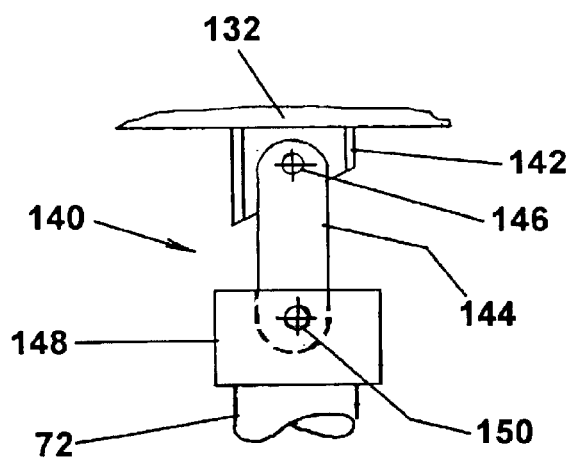

REMOTELY OPERATED OUTRIGGER

FIELD OF THE INVENTION

The present invention relates to outriggers for fishing boats and, in particular, an outrigger for a fishing boat that may be moved between a stowed and a deployed position from within the boat cabin.

BACKGROUND OF THE INVENTION

Outriggers are oftentimes used on fishing boats for supporting additional fishing lines during trolling at extended positions away from the boat. The outriggers may be located at varying support locations on the boat such as the gunwales, as disclosed in U.S. Pat. No. 5,921,196 to Slatter. The outriggers are normally stowed in a lowered horizontal inboard position. For trolling the outriggers are raised to an inclined position and rotated to an outboard position. The rotation and inclination are accomplished by manually swiveling and locking the outriggers in the desired position.

Outriggers mounted on the roof of the boat are also popular and many boats are furnished with in-place mounting fixtures for facilitating installation. In one approach, a rotating sleeve is mounted on the roof that is rotated by a lower handle in the cockpit or cabin to move the outrigger between the inboard and outboard positions. The outrigger boom is pivotally coupled to the sleeve at a coupling reachable only above the roof. Adjustment requires the operator to climb outwardly of the roof to unlock the coupling, raise or lower the boom as required, and thereafter relock the coupling. In addition to the inconvenience, time and dexterity required to reposition the outrigger, the task is exceedingly dangerous during rough weather conditions.

An adjustable outrigger controlled from the cabin is disclosed in U.S. Pat. No. 6,408,779 to Roy. The outrigger is pivotally supported on a sleeve at the boat roof and manually rotatable from the cabin. The outrigger boom is pivotally supported on the sleeve and raised and lowered by an external hydraulic cylinder operated by an electrically powered and controlled pump assembly. While simplifying the deployment of the outrigger, the additional components are subject to corrosion, particularly the cylinder piston. Further, the electrical and hydraulic lines must be routed through the cabin and roof, adding to the complexity and cost of the system.

SUMMARY OF THE INVENTION

The present invention provides a remotely controlled outrigger having positional capabilities for the outrigger within a single compact package at the existing mounting location and having both angular controls executed from a common handle. The outrigger comprises a vertical sleeve mounted on the boat roof that receives a control cartridge having the outrigger boom pivotally attached thereto. The cartridge includes an operating handle for rotating the sleeve and for operating a hydraulic cylinder that is connected to the boom to vary the boom inclination. Thus, by operating a single manual device, the operator can remotely move the outrigger between a stowed position and a trolling position. All components are contained within a single package that may be installed as original or after sale equipment with simple fasteners and without requiring modifications or installation interfaces in the boat cabin.

Accordingly, it is an object of the present invention to provide a simple to install and control outrigger positioning apparatus.

Another object of the invention is to provide a fishing boat outrigger that may be remotely positioned by a manual control within the boat cabin.

A further object of the invention is to provide a remotely controlled outrigger that is rotated and inclined between inboard and outboard positions by a single operating handle in the cabin.

DESCRIPTION OF THE DRAWINGS

The above and other objects and advantages of the present invention will become apparent upon reading the following detailed description taken in conjunction with the accompanying drawings in which:

FIG. 3 is a front view of the outrigger of FIG. 2 in the stowed position;

FIG. 4 is a side view of the outrigger of FIG. 3;

FIG. 5 is a top view of the outrigger of FIG. 3;

FIG. 10 is a fragmentary cross sectional view of the shoulder bolt attachment of the control cartridge in the mounting sleeve;

FIG. 11 is a fragmentary cross sectional view of the outrigger detent;

FIG. 12 is a fragmentary side view of the connecting linkage between the outrigger boom and the elevating piston;

FIG. 14 is a fragmentary cross sectional view of the pressure relief valve.

DETAILED DESCRIPTION OF THE PREFERRED EMBODIMENT

Figure 1:
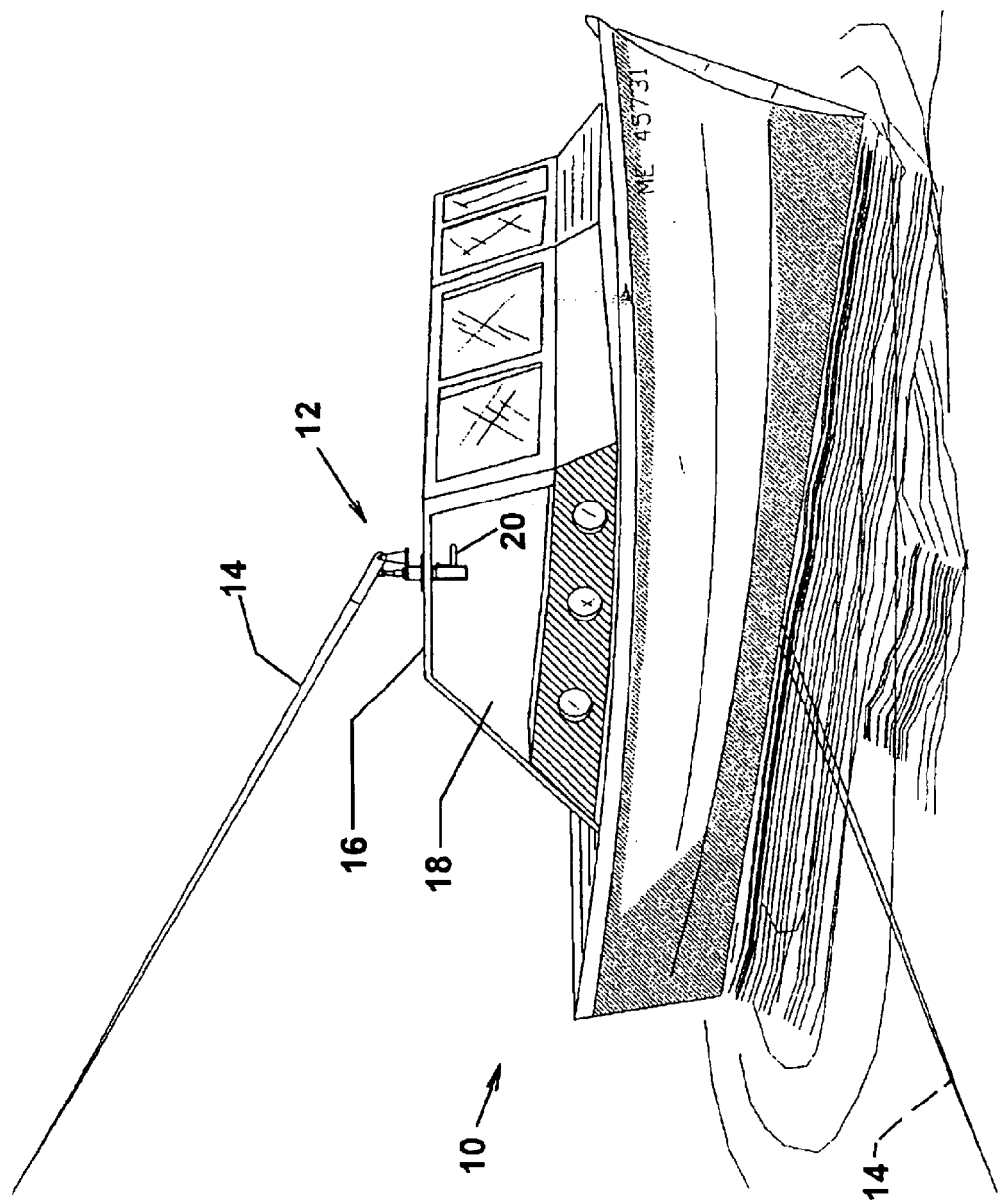
FIG. 1 is a perspective view of a fishing boat provided with a remotely controlled outrigger shown the deployed outboard position in accordance with a preferred embodiment of the invention.
Figure 2:
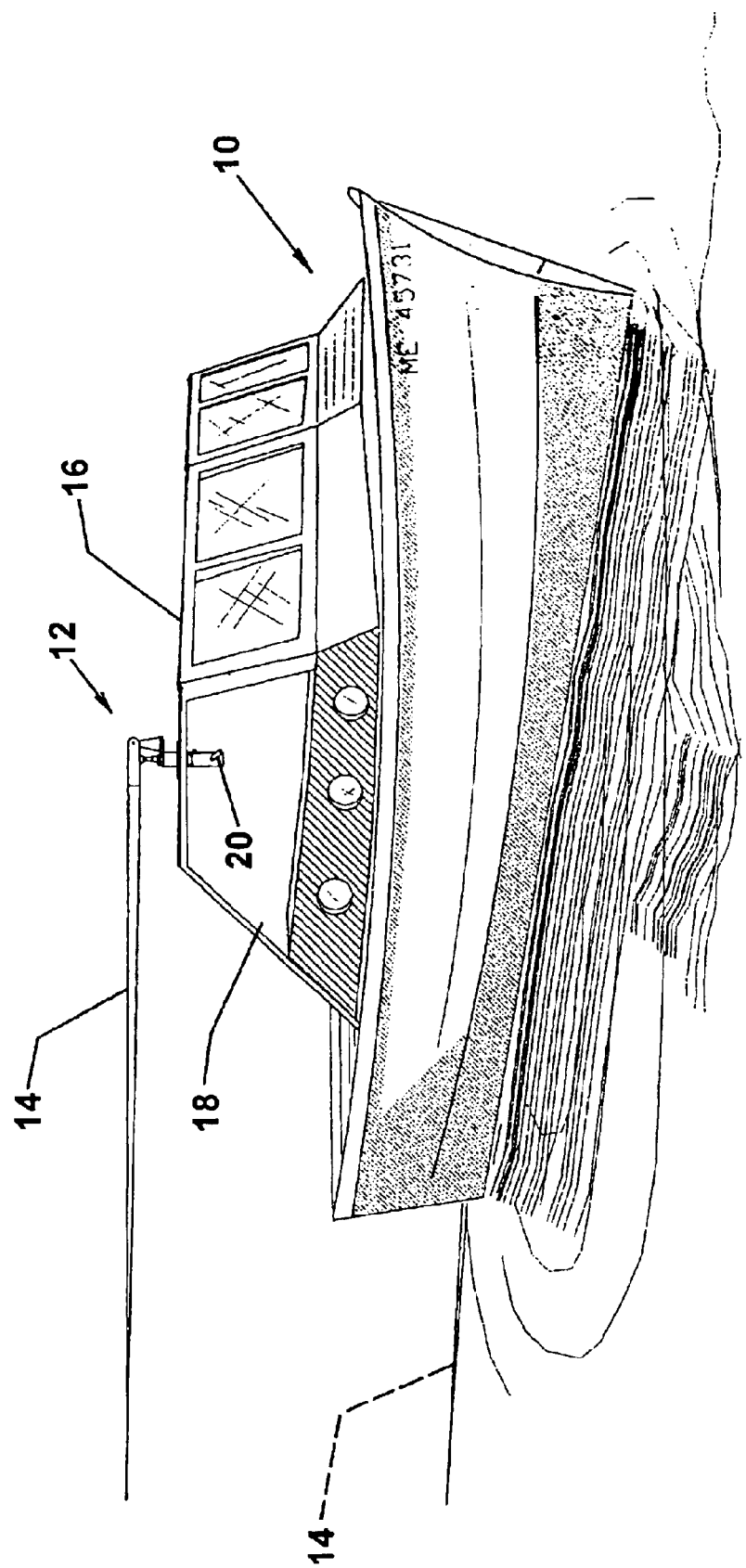
FIG. 2 is a perspective view of a fishing boat of FIG. 1 showing the remotely controlled outrigger in the inboard stowed position.
Figure 8:
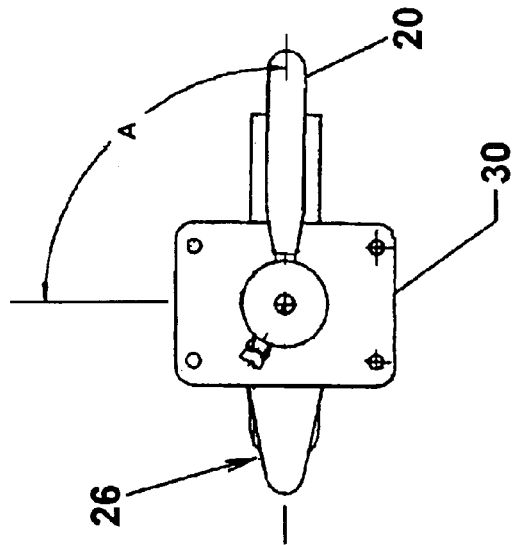
FIG. 8 is a top view of the outrigger of FIG. 6 in the raised and deployed position.

Referring to the drawings for the purpose of describing the preferred embodiments only and not for limiting same, FIGS. 1 and 2 show a fishing boat 10 having a remotely controlled outrigger 12 carrying an outrigger pole 14. The outrigger 12 is mounted on the roof 16 of the boat cabin 18 and moveable by an operator from within the cabin between the stowed inboard position of FIG. 2 and the deployed outboard position in FIG. 1.

The outrigger 12 is adapted to be mounted on other roof or canopy designs used in connection with fishing boats, such as T-top roofs. Moreover, the outrigger 12 may be mounted on other boat structure, such as gunwales, from which it is desired to deploy pole structures for additional trolling locations from the boat.

The outrigger 12 is manually actuated by a handle 20 located below the roof 16 to pivot the pole 14 about a horizontal axis and rotate the pole about a vertical axis, as described in detail below, between the positions.

Referring to FIGS. 3 through 5 and 9, the outrigger 12 includes a mounting sleeve 22 carrying a rotatable control cartridge 24. The control cartridge is coupled to a boom assembly 26 that carries the outrigger poles. The mounting sleeve 22 includes a rectangular mounting plate 30 having a support cylinder 32 extending transversely through a central aperture therein The cylinder 32 is attached to the mounting plate 30 by suitable means such as a circumferential weld 33. The lower portion of the cylinder 32 extends downwardly through a hole formed in the roof 16. The mounting plate 30 is attached to the roof 16 with suitable mechanical fasteners 34 (FIG. 5).

Figure 9:
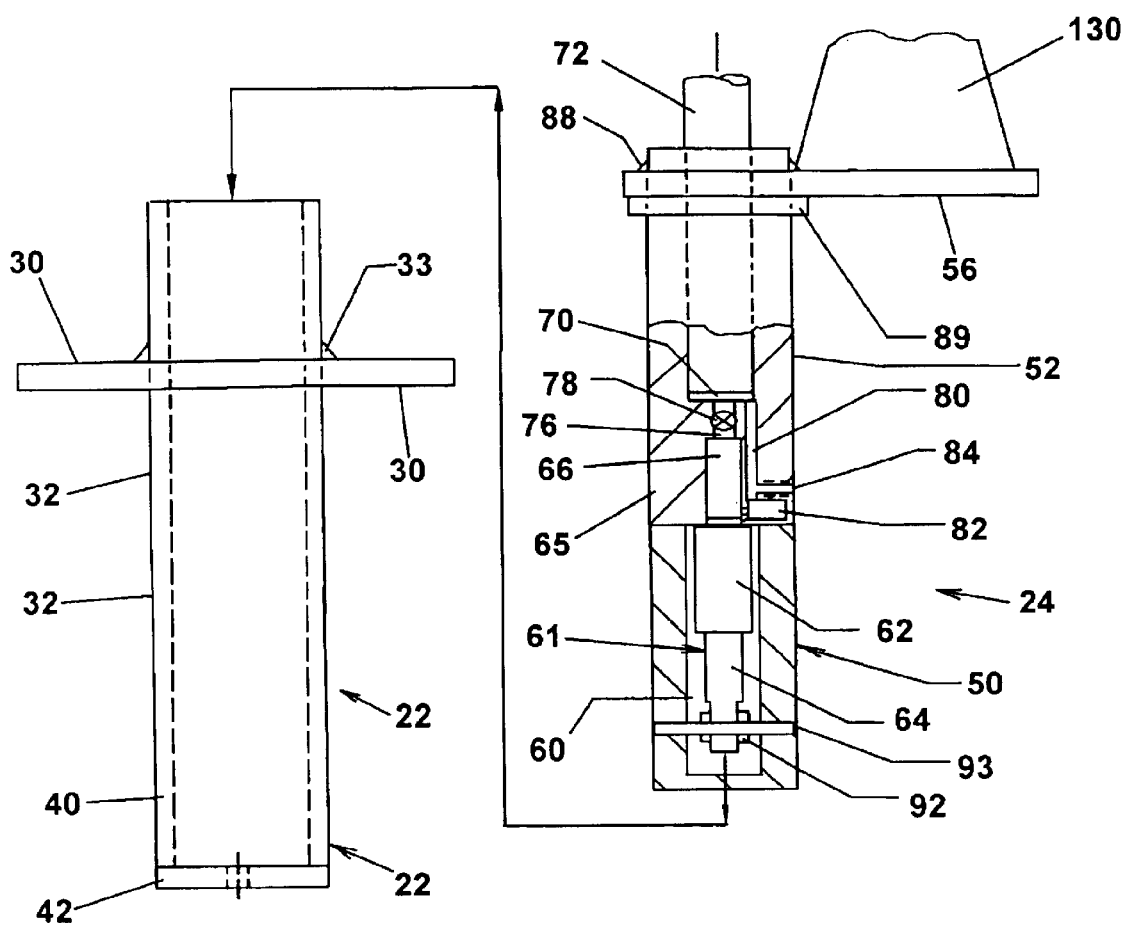
FIG. 9 is a disassembled view of the control cartridge and mounting sleeve of the outrigger.

As further shown in FIG. 9, the support cylinder 32 includes a cylindrical wall 40 having a circular base 42 at a lower end. The inner surfaces of the wall 40 and base 42 define an upwardly opening cartridge cavity. As indicated by the arrows in FIG. 9, the control cartridge 24 is slidably received in the cavity. Referring to FIG. 10, the cartridge 24 is rotatably supported on the base 42 at an annular washer 44. The cartridge 24 is axially rotatably retained at the base 42 by a shoulder bolt 46.

Referring to FIG. 9, the control cartridge 24 includes a pivot block 50 and a hydraulic actuator 52 carrying at an upper end a support base 56 of the boom assembly 26.

The pivot block 50 is cylindrical and includes a diametral slot 60. The pivot block 50 is coaxially connected to the bottom surface of the hydraulic actuator 52 by suitable means, such as fasteners or welds, not shown. A piston assembly 61 is radially offset on the actuator and includes a guide bushing 62 and a plunger 64 is positioned in the slot 60. The bushing 62 extends downwardly from the actuator 52 as an integral or as a separate component.

The actuator 52 includes a cylindrical body 65 having a bore 66 coaxial with the plunger 64. The plunger 64 is reciprocable by the handle 20, as described below to effect a pumping stroke. An upwardly opening piston bore 70 is coaxially formed in the upper end of the body 65 of the actuator 52. An elevating piston 72 is slidably disposed in the bore 70. A flow port 76 is formed in the body 65 fluidly connecting to top of the bore 66 with the bottom of the bore 70 below the elevating piston 72. A one way check valve 78 is disposed in the port 76 and operative to permit fluid flow into the bore 70 while blocking return flow. A bleed line 80 fluidly connects the bore 70 with a reservoir 82 having an outlet with the bore 70. A threaded cross port 84 intersects the bleed line 80. Referring to FIG. 14, a pressure valve 86 is carried in the port 84 and is manually rotated to move the valve 86 between a closed position blocking the bleed line 80 and an open position permitting flow to the reservoir.

Accordingly, in a well known manner, a pumping stroke at the actuator plunger 64 will pressurize the bore 70 thereby extending the elevating piston. Opening the bleed valve 86 vents the bore 70 allowing the elevating piston 72 to retract.

The upper end of the actuator body 65 extends through an opening in the base plate 56 of the boom assembly 26 and is attached thereto by a circumferential weld 88. An annular washer 89 is carried on the body 65 below the plate 56, and in combination with the washer 44 at the base 42 provides low friction bearing surfaces during rotation of the actuator cartridge 24.

Figure 7:
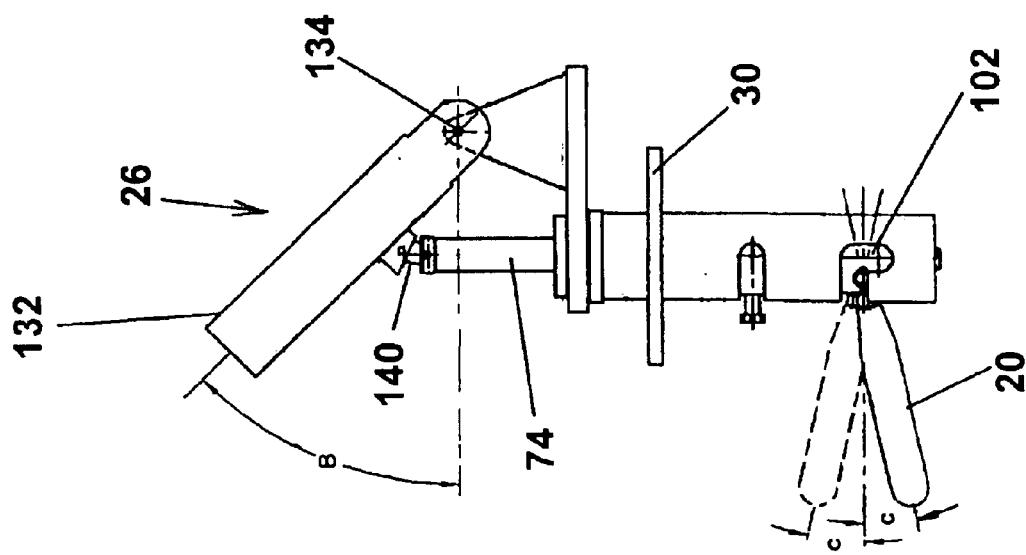
FIG. 7 is a side view of the outrigger of FIG. 6.
Figure 6:
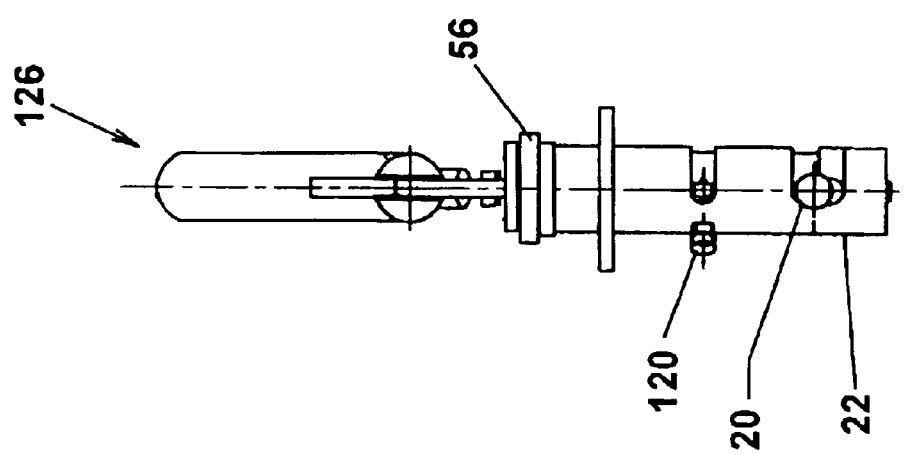
FIG. 6 is a front view of the outrigger in the raised position.
Figure 13:
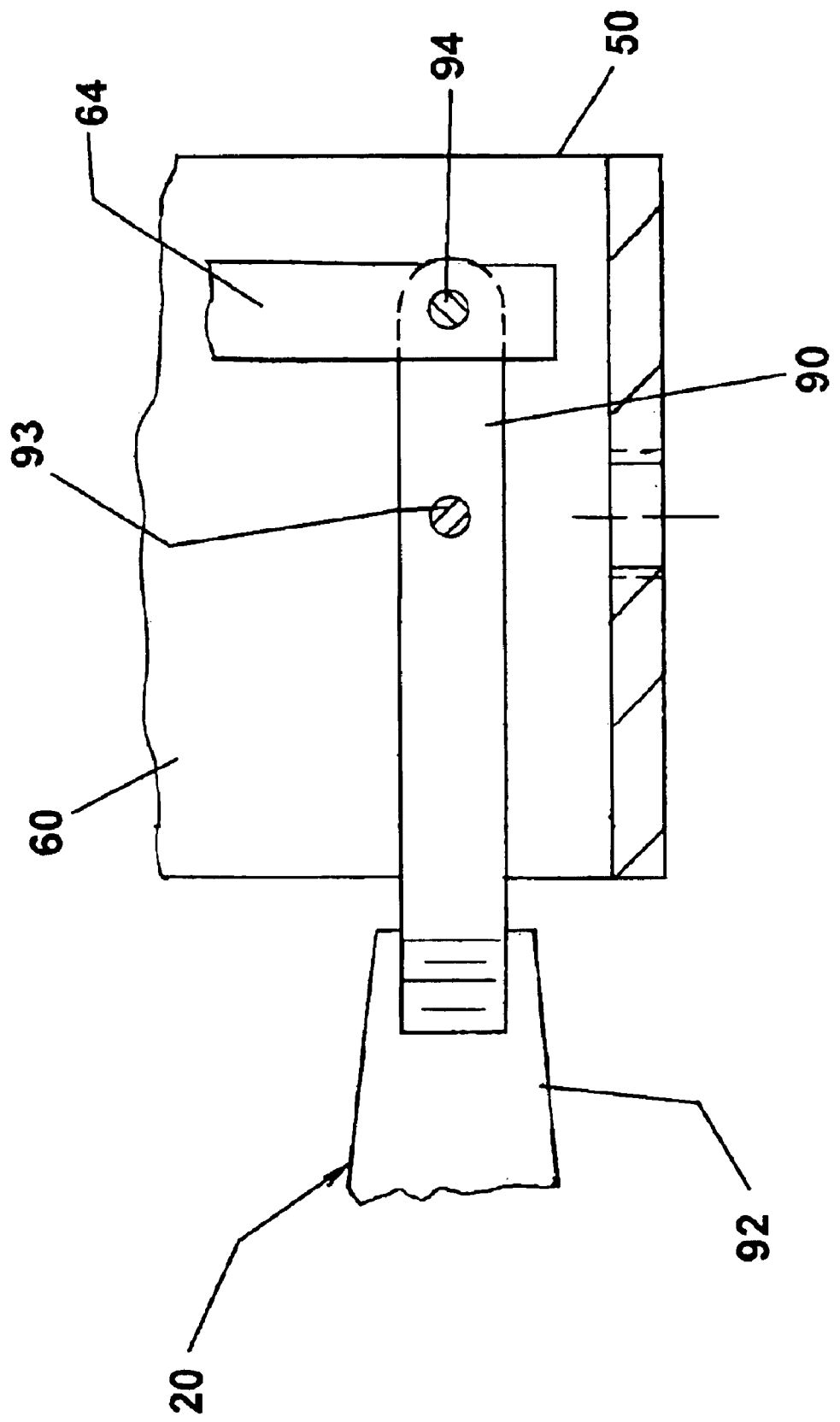
FIG. 13 is a fragmentary cross sectional view of the jack handle connection with the pumping plunger and the mounting sleeve.

Referring to FIG. 13, the handle 20 includes an inner arm 90 and an outer arm 92. The outer arm 90 includes a threaded hole at the inner end that is connected in assembly to a threaded outer end of the inner arm 90. The inner arm 90 extends into the slot 60 and is pivotally connected to the block 50 by cross pin 93. The inner end of the arm 90 is pivotally connected to the lower end of the plunger 64 by cross pin 94. Accordingly, pumping the handle 20 through the included angles "C" as illustrated in FIG. 7 will extend the elevating piston 72 to raise the boom assembly 26 through an included angle "A" (FIG. 9). Opening the bleed valve 86 will lower the boom assembly.

Referring to FIGS. 3 and 4, the mounting sleeve 22 is provided with a circumferential horizontal pivot slot 100 formed in the cylinder 40 registering with the inner arm of the handle. The slot spans an angle of about 90°. The ends of the slot 100 includes downwardly extending notches 102 at the ends thereof. In assembly the inner arm of the handle projects outwardly through the pivot slot 100. Rotation of the handle 20 within the confines of the slot 100 rotates the actuator cartridge 24 and the boom assembly 26 between the inboard and outboard positions. The cylinder includes an upper slot 110 that spans an angle of about 90° and registers with bleed valve 86. The bleed valve 86 is inserted through the slot 110 into the actuator body 65 at port 84. Accordingly, the bleed valve 86 rotates with the cartridge within the confines of the slot 110 between the outboard and inboard positions.

Referring to FIG. 11, while the pivot slot 100 defines the permissible rotation of the cartridge, a spring biased detent assembly 120 is provided to establish affirmative stops at the inboard and outboard position. The detent assembly is carried on the cylinder and is radially moveable as indicated by the arrows from the detented position whereat the detent tip 122 engages a recess 124 in the actuator body 65 at either of the outrigger positions a retracted position permitting free rotation of the actuator body 65.

Referring to FIG. 4, the boom assembly 26 includes the pivot plate 56, a triangular support bracket 130, and an outrigger boom 132. The support bracket projects upwardly from the top surface of the pivot plate 56. The rear end of the boom 132 includes a vertical slot that receives the upper end of the bracket. The boom 132 is pivotally connected to the bracket 130 by a cross pin 134 for pivotal rotation about a horizontal axis. The boom 132 includes an outer cylindrical sleeve 136 having an outwardly opening socket 138 for telescopically receiving the base of an outrigger pole as shown in FIGS. 1 and 2.

Referring to FIG. 12, the boom 132 is connected with the elevating piston by link assembly 140. The link assembly 140 comprises a cylindrical bracket 142 connected to the bottom surface of the boom 132, a link 144 pivotally connected by pin 146 to the bracket 142, and a connector collar 148 connected to the top of the elevating piston 72 and pivotally connected to the lower end of the link 144 by pin 150. According, the link assembly maintains operative engagement with the boom as the elevating piston moves between the retracted and extended positions.

When it is desired to move the outrigger pole from the inboard position of FIG. 2 to the outboard position of FIG. 1, the valve 86 is closed and the handle 20 pivoted between the raised and lower positions in the notch 102, thereby reciprocating the plunger 64 as shown in FIG. 7 and extending the elevating piston 72 to upwardly incline the boom through the included angle "A" (FIG. 7), preferably around 45°. At a raised position, the detent assembly 120 is retracted and the handle 20 rotated across the slot 100 to the position whereat the detent assembly is released to lock the cartridge and boom assembly in the outboard position. When it is desired to return the boom to the inboard position, the above procedure is reversed.

While the present embodiment has been described with reference to the preferred embodiments, other modifications and changes thereto will become apparent. Accordingly, the invention is to be interpreted solely with reference to the following claims.

What is claimed:

1. In a fishing boat having a roof with a opening therein, a remotely controlled outrigger: comprising: a mounting plate attached to a top surface of the roof an carrying a cylindrical mounting sleeve having an upper portion extending above said roof and a lower portion extending below said roof, said lower portion of said mounting sleeve having a first slot therein spanning a sector of around 90°, said mounting sleeve having a base at a lower end and forming an upwardly opening cavity; a cartridge assembly received in said cavity and having a pivot member engaging said base; a second slot formed in said base intersecting said first slot; a handle having an inner end pivotally connected to said pivot member about a horizontal axis within said second slot and an outer end extending outwardly through said first slot whereby rotation of said handle rotates said pivot member within the confines of said first slot; a cylindrical actuator member received in said cavity and connected with said pivot member and having an upper end extending above said upper portion of said mounting sleeve; a first piston member slidably carried in a vertically downwardly opening first bore in said actuator member and pivotally connected to said inner end of said handle whereby reciprocation of said handle about said horizontal axis effects reciprocation of said first piston member in said first bore; a second piston member slidably carried in a vertically upwardly opening second bore in said actuator member, said second piston member having a free end extending upwardly beyond said mounting sleeve; inlet port means including valve means for unidirectionally permitting fluid flow from said first bore to said second bore upon reciprocation of said handle to effect upward movement of said second piston member; second port means fluidly interconnecting said second bore with said first bore; second valve means for controlling fluid flow through said second port means whereby said second valve means in an open position vents said second bore to permit downward movement of said second piston member; a horizontal support plate mounting at said upper end of said actuator member and rotatable therewith; a boom member for carrying an outrigger pole on one end pivotally connected to said support plate for rotation about a horizontal axis; and linkage means connecting said free end of said second piston member with said boom member whereby reciprocation of said handle extends said second piston member to raise said boom member and rotation of said handle rotates said boom member and said cartridge assembly between an inboard position and an outboard position to deploy said outrigger pole for trolling from said fishing boat.

2. The outrigger as recited in claim 1 wherein said mounting sleeve includes a second circumferential slot and said second valve means extends outwardly therethrough.

3. The outrigger as recited in claim 2 including means extending through said base of said mounting sleeve and connecting with said pivot member for permitting rotation while preventing removal of said cartridge assembly from said mounting sleeve.

4. The outrigger as recited in claim 3 wherein said support plate includes an upwardly extending bracket pivotally connected to an other end of said boom member.

5. The outrigger as recited in claim 3 including detent means between said mounting sleeve and said actuator member providing detented locations for said inboard position and said outboard position.

6. The outrigger as recited in claim 5 wherein said linkage means includes a bracket attached to said boom member and a link pivotally connected between said bracket and said free end of said second piston member for accommodating inclination of said boom member during extension of said second piston member.

7. A remotely controlled outrigger for mounting on a fishing boat for movement between an inboard position and an outboard position, said outrigger comprising: a sleeve member for attachment to the fishing boat and having an upwardly opening cavity; a cartridge member supported in said sleeve member and rotatable about a vertical axis between said inboard position and said outboard position, said cartridge member including a hydraulic actuator including a piston member supported in a cylinder, said piston member moveable in response to fluid flow in said cylinder between an extended position and a retracted position; plunger means for delivering said fluid flow to said cylinder; an outwardly projecting handle pivotally supported on said cartridge member about a horizontal axis and operatively connected with said plunger means wherein reciprocation of said handle about said horizontal axis operates said plunger means for delivering said fluid flow to said cylinder to move said piston member from said retracted position to said extended position, and wherein rotation of said handle rotates said cartridge member between said inboard position and said outboard position; stop means operative between said sleeve member and said cartridge member to establish said inboard position and said outboard position; a support member attached to the upper end of said cartridge member; a outrigger boom adapted to carry an outrigger pole pivotally connected at one end to said support member for pivotal movement about a horizontal axis between a lowered position and a raised position; connecting means between said piston member and said boom member for moving said boom between said lowered position and said raised position as said piston member moves between said retracted position and said extended position; and vent means for releasing fluid from said cylinder to allow said piston member to return to said retracted position and lower said boom to said lowered position.

* * * * *